United States Patent [19]
Boudreau et al.

[11] Patent Number: 5,565,934
[45] Date of Patent: Oct. 15, 1996

[54] MOLDED VIDEO DISPLAY SCREEN BEZEL

[75] Inventors: David E. Boudreau, Leominster; George A. Doumani, North Andover; William J. Pauplis, Hudson; Victor M. Samarov, Carlisle, all of Mass.

[73] Assignee: Digital Equipment Corporation, Maynard, Mass.

[21] Appl. No.: 831,720

[22] Filed: Feb. 5, 1992

[51] Int. Cl.$^6$ .............................. H04N 5/65; H01J 61/30
[52] U.S. Cl. ........................ 348/818; 220/2.1 A; 348/823
[58] Field of Search .................................. 358/246, 247, 358/248, 255, 245, 485; 248/917, 918; 312/7.2, 223.2; 269/908; 425/522

[56] References Cited

U.S. PATENT DOCUMENTS

| | | |
|---|---|---|
| 2,750,587 | 6/1956 | Nicholson et al. . |
| 3,013,117 | 12/1961 | Nichol ..................... 358/245 |
| 3,136,850 | 6/1964 | Blaker . |
| 3,200,188 | 8/1965 | Lange et al. .............. 358/245 |
| 3,206,056 | 9/1965 | Stel ........................ 358/245 |
| 3,271,516 | 9/1966 | Damm . |
| 3,310,194 | 3/1967 | Bradu et al. ............. 358/245 |
| 3,716,662 | 2/1973 | Johnson . |
| 4,064,542 | 12/1977 | Enkhaus et al. . |
| 4,158,419 | 6/1979 | Nolan ..................... 358/246 |
| 4,306,253 | 12/1981 | Nakamura . |
| 4,360,838 | 11/1982 | Babicz et al. . |
| 4,560,900 | 12/1985 | Ikegaki et al. . |
| 4,572,592 | 2/1986 | Haven ..................... 358/254 |
| 4,593,227 | 6/1986 | Bruce et al. ............. 358/248 |
| 4,686,415 | 8/1987 | Strauss ................... 313/482 |
| 4,731,557 | 3/1988 | Asano et al. . |
| 4,820,224 | 4/1989 | Lemche . |
| 4,873,578 | 10/1989 | Tognoni et al. ......... 358/254 |
| 5,019,745 | 5/1991 | Deal et al. . |
| 5,041,944 | 8/1991 | Campisi ................. 358/254 |
| 5,122,928 | 6/1992 | Lo .......................... 358/254 |
| 5,166,802 | 11/1992 | Thiele et al. ............ 358/254 |

Primary Examiner—Sandra L. O'Shea
Assistant Examiner—John Ning
Attorney, Agent, or Firm—Denis G. Maloney; Arthur W. Fisher

[57] ABSTRACT

A method and apparatus for molding a video display screen bezel to a video display device, such as a CRT, is disclosed. The bezel is molded in such a way as to eliminate the need for fasteners between the bezel and the CRT and between the bezel and a housing or some other structural support. The molded bezel also prevents any undesirable shifting of the CRT with respect to the bezel due to accidental dynamic loads. The molding material conforms to the surface of the CRT compensating for any dimensional variations in the CRT while minimizing the size of the bezel. Molded within the bezel is a compensating means which absorbs stresses generated by the molding material both during and following the molding process which might otherwise be exerted on the CRT.

29 Claims, 6 Drawing Sheets

MOLDED VIDEO DISPLAY SCREEN BEZEL

FIELD OF THE INVENTION

The present invention relates to a video display screen bezel, and more particularly to a video display device housing including a bezel which is molded directly onto the periphery of a cathode ray tube (CRT) display screen.

BACKGROUND OF THE INVENTION

Generally, video display terminals, television cabinets, and other monitoring devices, hereinafter referred to as video display units, include a video display device, such as a cathode ray tube (CRT), and a preformed bezel. Often these video display units also have a housing or some other structural support which is fastened to the bezel.

In order to fasten a preformed video display screen bezel securely to a CRT, at least four factors should be considered. These include the normal dimensional variations of CRTs, pressure related stresses exerted by the bezel fastening apparatus on the CRT, the size of the bezel and CRT, and the cost of the video display unit. Often damaging pressure-induced stresses can be exerted upon the CRT when attempting to firmly attach the bezel to the CRT due to dimensional variations in the CRT. Such stresses can cause the CRT to crack or implode. To avoid these problems, extra effort is required, which can increase the size and cost of the video display units significantly.

As a practical matter, it is difficult to cast or mold CRTs to exact dimensions, for as the glass envelope of the CRT cools it will shrink unpredictably. The display screen surface is brought into strict tolerance by grinding and polishing or by a separate, polished, tightly toleranced glass screen surface fixed onto the existing screen. However, the other elements of the CRT may not be brought easily within strict tolerances. For instance, the circumference of a 19 inch CRT can vary by as much as ±78 mils. The fastening apparatus used to connect the bezel to the CRT must accommodate this variation to fit securely.

The two most common bezel fastening apparatus are mechanical fasteners and elastomeric adhesive materials. If the bezel is mounted mechanically, care must be taken not to concentrate undue pressure on the CRT at the mounting points. If the bezel is mounted with an adhesive material, care must be taken to avoid pressure-induced stresses on the CRT which may be created by the adhesive material as it cures or as the adhesive material changes dimensions due to changes in environmental variables such as temperature or humidity.

The use of mechanical fasteners to secure the bezel to the CRT may induce stress due to a concentration of pressure on small areas of the CRT. This stress can lead to the CRT imploding or cracking.

Often, mechanical fasteners compensate for the dimensional variations of CRTs by incorporating expanded alignment margins, which may increase the size of the fasteners. The bezel is required to surround and conceal these mechanical devices and fasteners. Thus, as the fastener size increases, the bezel size must also increase.

Furthermore, once assembled, mechanical fasteners frequently leave the CRT prone to highly undesirable shifting within the bezel which may occur under accidental dynamic loads experienced in shipping or under shock and vibration. The degree to which the mechanical fasteners can be tightened is limited due to possible damage to the CRT or the fasteners themselves.

Mechanical fasteners, whether many simple ones or few complicated ones require a substantial amount of time for assembly which adds to the manufacturing cost. In addition, most mechanical fasteners are difficult to apply automatically, and therefore, their use increases assembly time.

When using an adhesive to fasten a preformed bezel to the CRT, an elastomeric adhesive material, such as silicon resin, may be inserted into a recess between the bezel and the CRT. The fluid state of the adhesive material allows it to conform to the CRT and to compensate for any dimensional variations of the CRT. The bezel is typically designed to be large enough to accommodate the maximum expected dimensional variations of the CRT, while still allowing it to be attached to the CRT by the elastomeric adhesive material.

The assembly of such video display units may involve a lengthy process. The CRT first needs to be positioned within the preformed bezel in such a way as to center the display screen with respect to the front opening in the bezel. Once the positioning is correct, the CRT is held in place while the adhesive material is inserted between the CRT and the bezel and until the adhesive material has cured. The cure time for elastic materials may be considerable, for example, from several hours to overnight, resulting in a long assembly time and increased manufacturing cost.

Stresses may be exerted on the CRT by the adhesive material as it cures. Typical adhesives may be thermoplastic which become plastic and flow upon heating so that they can be inserted into the recess between the preformed bezel and the CRT. As the thermoplastic material cures, it cools and contracts. This contraction can exert pressure on the CRT producing corresponding stresses.

Following manufacturing, the video display unit may also be exposed to wide temperature variations including severe cold during shipping and storage and relatively high heat when operated in environments with no temperature control. These temperature variations cause the adhesive material to contract and expand, and thereby change dimension, which exerts pressure-related stresses on the CRT. When it contracts, the adhesive directly squeezes the CRT. When it tries to expand, the bezel may confine it, again causing it to exert force on the CRT.

One way to compensate for the expansion of the adhesive material is to provide a void between the preformed bezel and the CRT in the rearward portion of the video display unit. The adhesive material may expand into this void when the device is operated in a heated environment. This attempts to relieve any undesirable axial shifting of the CRT within the preformed bezel due to forces exerted on the frustro-conical section, typical of most CRTs, by the thermally expanding elastic material. This method does not address the pressure related stresses exerted on the CRT as the elastic material shrinks.

It is therefore desirable to provide a low cost video display unit which avoids the foregoing and other disadvantages of known units, and it is to these ends the present invention is directed. The invention eliminates the possibility of the CRT shifting within the bezel due to shock and vibration, reduces stress induced by the bezel fastening apparatus on the CRT, and compensates for the dimensional variations of the CRT while maintaining minimum overall video display unit dimensions, and affords other benefits and advantages.

SUMMARY OF THE INVENTION

The foregoing and other objects of the present invention may be accomplished by providing a video display unit with a video display screen bezel molded onto a video display device, such as a CRT, adjacent the display screen for supporting the CRT within a housing or some other structure. This allows the bezel to be configured and dimensioned to be of minimal size while still compensating for the maximum expected dimensional variations of the CRT. This also eliminates the possibility of any undesirable axial shifting of the CRT with respect to the bezel.

A compensating means may be molded within the bezel and may include a combination of a resilient member and one or more channels formed in the bezel. The resilient member is shaped to conform to the contoured surface of the CRT and is placed within the mold prior to the molding process in such a way as to position corrugations in the resilient member about the location where the channels in the bezel will be formed. This combination allows the compensating means to absorb the squeezing and pulling effect caused by the expansion and contraction of the bezel around the periphery of the CRT as environmental variables change both during and following manufacturing. These forces might otherwise be exerted on the CRT and increase the risk of cracking or implosion of the CRT.

In a preferred embodiment of the invention, there is at least one pair of diametrically opposed compensating means. These pairs of compensating means divide the bezel into similar portions and thus distribute the pressure-induced stresses evenly over the surface of the CRT.

The bezel may also be molded with a circumferential channel around its rear opening which permits a snap-fit engagement with a housing or other structural support having a co-acting step-shaped lip. This eliminates the need for fasteners between the housing and the bezel.

Additionally, the bezel may have a generally cup-shaped cross-section which encompasses the front surface edge of the display screen without affecting the image shown thereon, a surface intermediate between the display screen and a frustro-conical portion of the CRT, and a section of the frustro-conical portion, that is, the bezel wraps around the periphery of the display screen portion of the CRT. This cross-sectional shape eliminates the need for fasteners between the bezel and the CRT and prevents shifting of the CRT relative to the bezel under accidental dynamic loads.

A bezel incorporating compensating means could be molded in the same way as previously described and then removed from the CRT and sold as a separate entity. This would allow customers to provide their own CRTs and buy the bezels separately.

The bezel may be formed through the use of a low pressure molding process, for example reaction injection molding, with a strong, elastic material which has a fast cure time, such as Mobay's Baydur 726. This produces a display screen bezel with a short assembly time thereby reducing manufacturing costs.

DETAILED DESCRIPTION OF THE INVENTION

Figure 1:
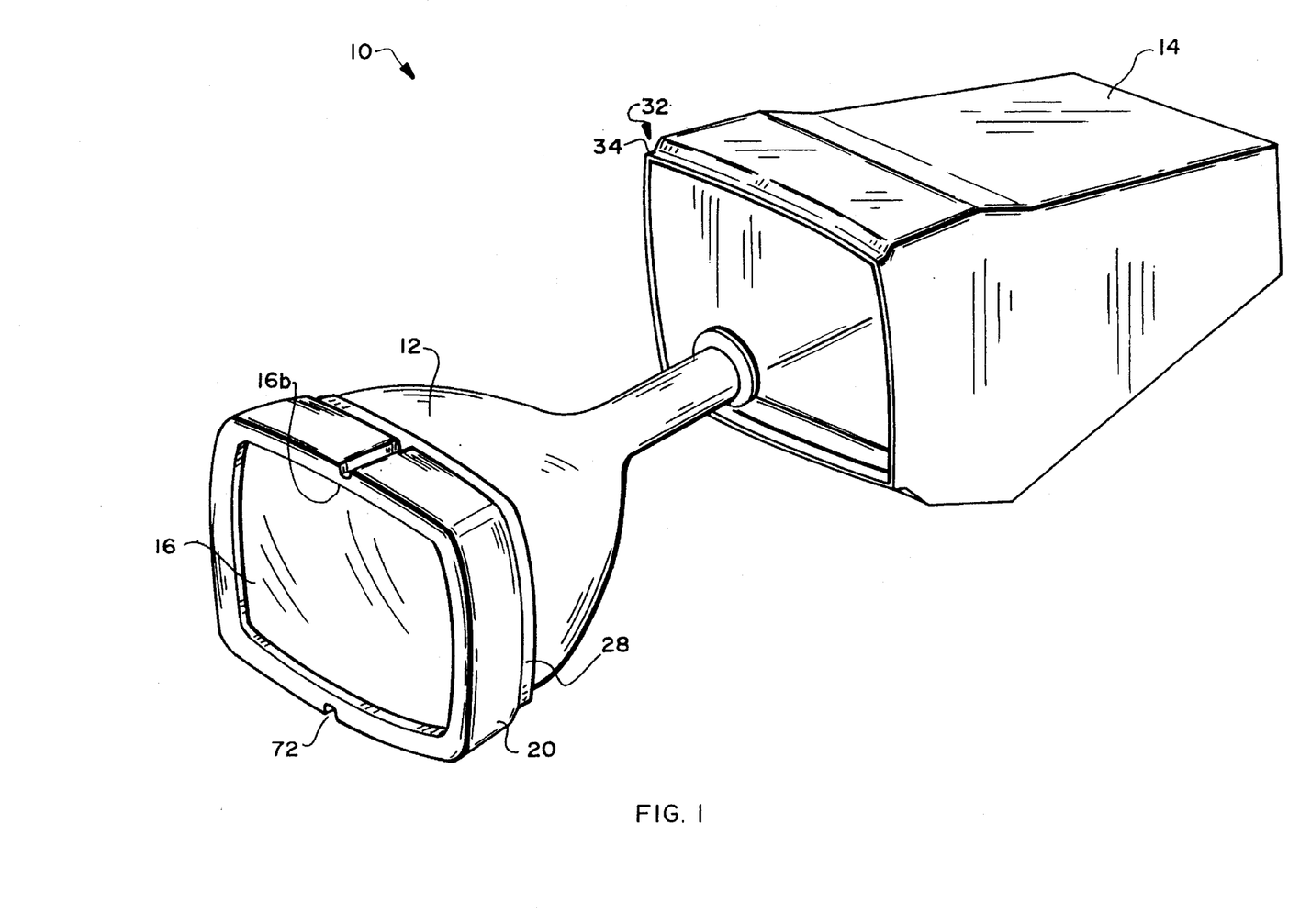
FIG. 1 is an exploded perspective view of a video display unit in accordance with the invention.
Figure 2:
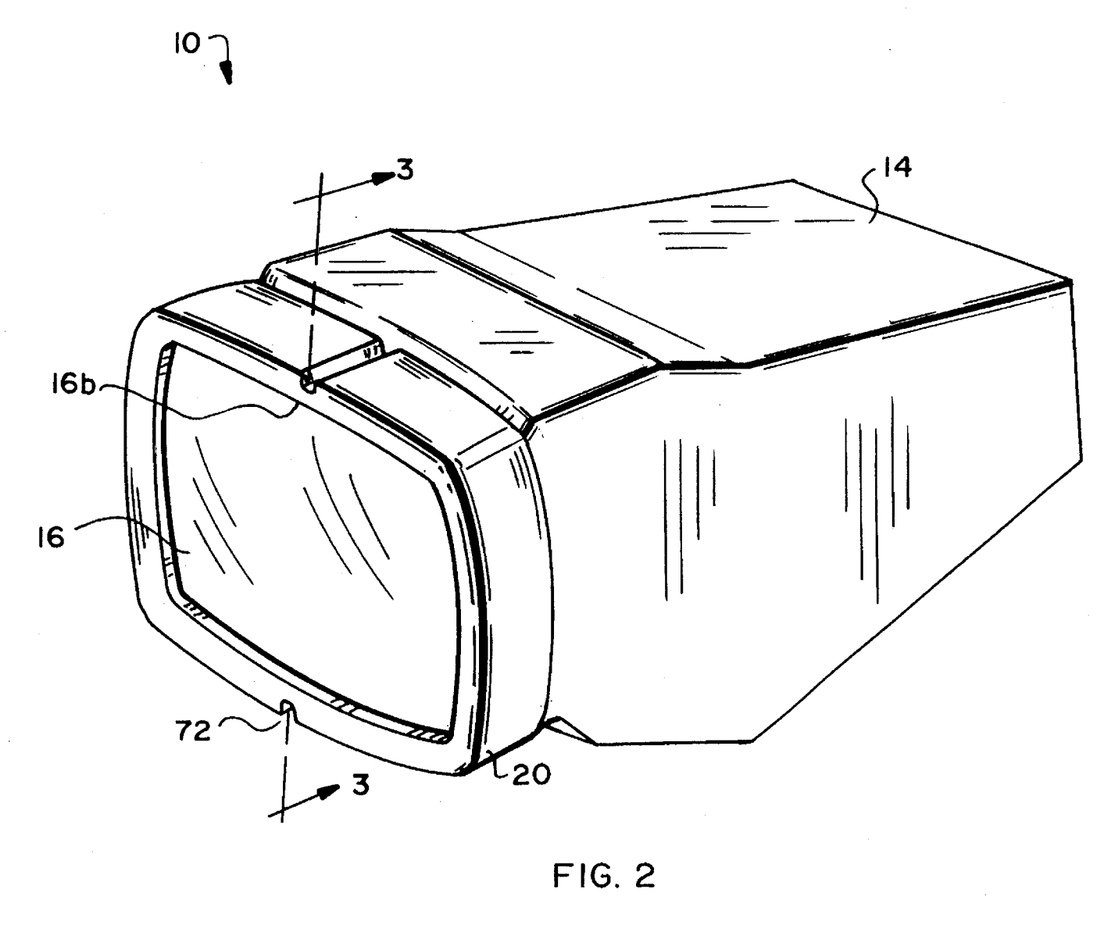
FIG. 2 is a perspective view of the video display unit of FIG. 1 shown in its assembled condition.

FIGS. 1 and 2 show a video display unit 10 in accordance with the invention comprising a video display device such as a cathode ray tube (CRT) 12 adapted to be enclosed by a rearwardly extending housing 14. The CRT 12 has a front video display screen 16 with a molded bezel 20 disposed about its front periphery.

Figure 3:
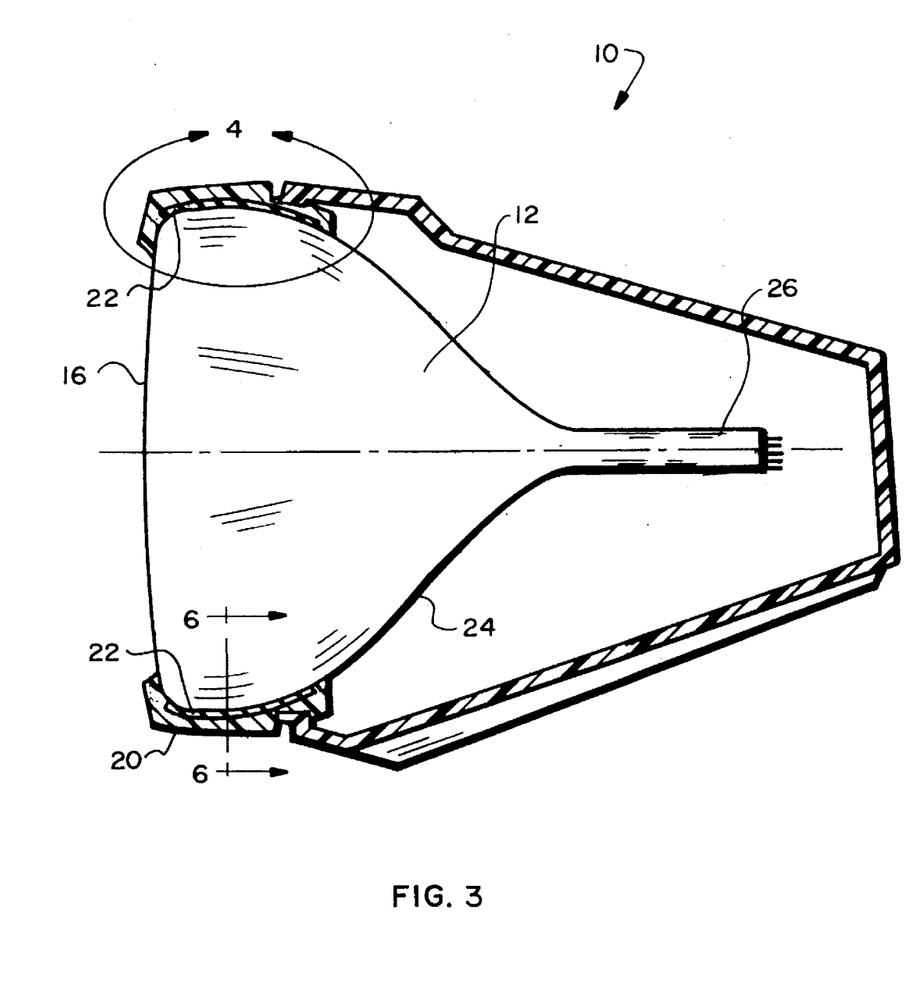
FIG. 3 is a cross-sectional view of the video display unit taking generally along line 3—3 of FIG. 2.
Figure 4:
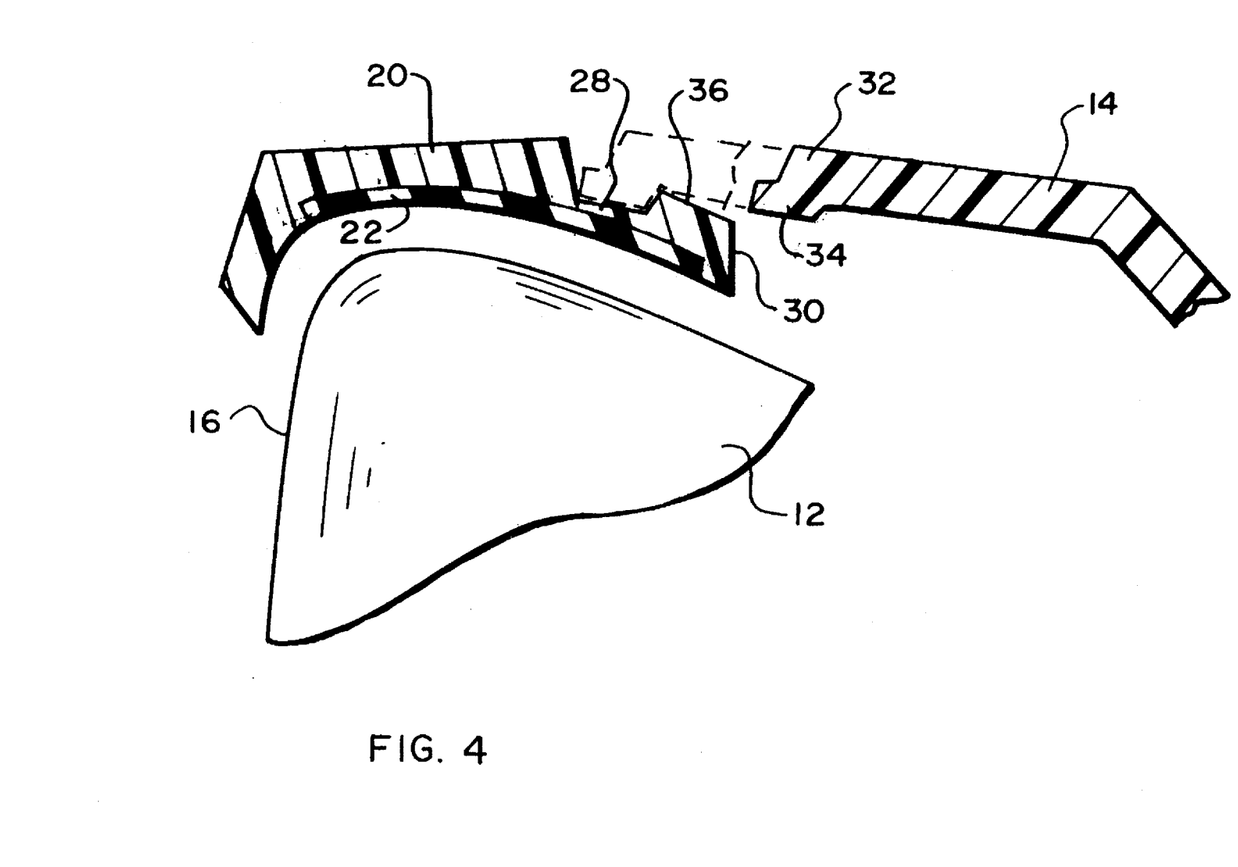
FIG. 4 is an enlarged exploded cross-sectional view of a portion of the video display unit of FIG. 3 encompassed approximately by the line 4.

FIG. 3 shows the details of the assembled video display unit 10 in cross-section. The front display screen 16 of the CRT 12 on which images are displayed may be generally planar or slightly curved. An intermediate surface 22 of the CRT extends circumferentially about the screen and connects the screen to a glass envelope having a rearwardly extending frustro-conical portion 24 that terminates in a neck portion 26. The bezel 20 is disposed about intermediate surface 22 and encircles and overlaps slightly the display screen and an adjacent portion of the frustro-conical envelope as shown in FIGS. 3 and 4. The bezel wraps around the periphery of the display screen giving the bezel a somewhat cup-shaped cross-section, as best shown in FIG. 4.

The generally cup-shaped configuration of the bezel 20 conforms to and firmly holds the bezel onto the contoured periphery of the CRT 12 without the necessity of bonding between the bezel and the CRT. This prevents shifting of the CRT with respect to the bezel under accidental dynamic loads. If there is bonding between the bezel and CRT, other cross-sectional shapes of the bezel, which do not conform to the periphery of the CRT as effectively as the cup-shape shown in the Figures, could be conveniently employed.

FIG. 4 shows more clearly the interconnection details between the bezel 20, the CRT 12, and the housing 14. As shown, the bezel has a circumferential indentation 28 that forms a channel that extends about the periphery of the bezel adjacent to a rear edge 30. The circumferential channel 28 may be generally U-shaped as shown. The forward portion of housing 14 may be formed to have a stepped-shaped peripheral lip 32 with a downwardly extending portion 34, as shown. Lip 32 and forwardly extending portion 34 define the front opening of the housing which receives the CRT, as indicated in FIG. 1. The top peripheral surface 36 of the bezel which extends rearwardly from channel 28 to rear edge 30 slopes radially inward (toward the center of the rear opening of the bezel) as shown to enable the extended portion 34 of the housing lip to slide over the bezel and be received within channel 28. The length of the extended portion 34 of the peripheral lip 32 is selected to correspond to the width of the channel 28 to provide a snap-fit engagement between the lip and the channel which allows the housing to be fastened to the bezel without the need for auxiliary hardware or other fastening devices.

Figure 5:
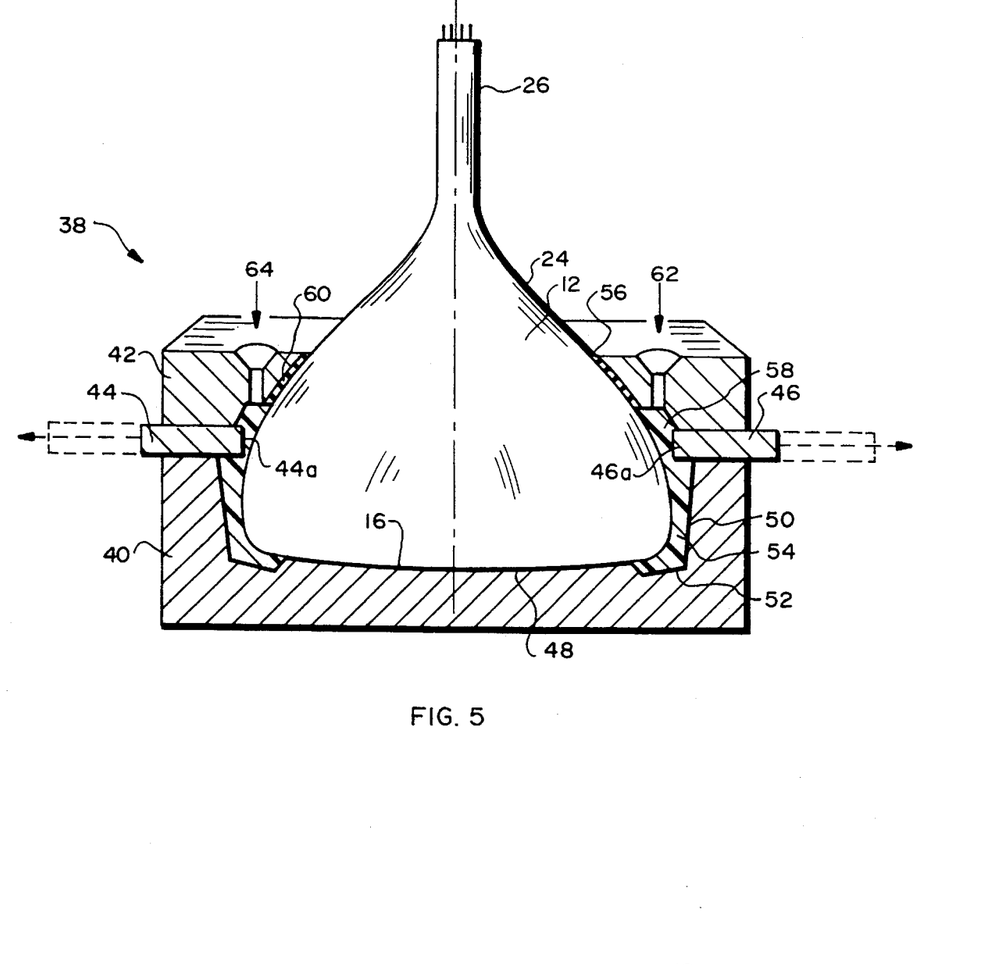
FIG. 5 is a cross-sectional view of a CRT inserted into a mold for creating a display screen bezel.

In the preferred embodiment of the invention, the bezel 20 is formed directly on the CRT in a manner which will now be described. CRT 12 may be placed into a mold 38 with the display screen 16 directed downward as shown in FIG. 5. The mold 38 preferably includes three distinct operative elements i.e., a base mold portion 40, a cover mold portion 42, and a plurality of mold inserts or slides 44, 46 that are interposed between the base and cover mold portions.

The base mold 40, may be a generally rectangular box-like structure with a respective rectangular cavity. The bottom 48 of the rectangular cavity is preferably accurately dimensioned with respect to the display screen surface 16 so that it conforms to the contour of the screen. However, the side wall 50 of the cavity is spaced from the CRT as shown. A peripheral downwardly extending (in the figure) furrow 52 may be formed within the cavity side wall 50 adjacent the bottom 48 of the mold to define an annular recess in the mold cavity that extends about the front periphery of the CRT display screen at a level below that of the display screen. The side and bottom walls of the furrow 52, along with the side wall 50 of the cavity, are configured and dimensioned to define at least in part the configuration of the bezel. The CRT and the base mold 40 provide an annular cavity 54 around and slightly below the peripheral edge of the display screen which defines the shape of the forward portion of the bezel, as will be discussed shortly.

The interior cavity of the cover mold 42 along with the slides 44, 46 may be configured to define the remaining rearward part of the bezel 20. The cover mold 42 is structured and dimensioned for connection and cooperation with the base mold 40 to provide the desired bezel. The upper walls have a central contoured opening 56 through which the neck 26 and a part of the rearwardly extending frustro-conical portion 24 of the CRT 12 pass when the cover mold is connected to the base mold and the mold slides are inserted. The CRT and the cover mold create another annular cavity 58 around the frustro-conical portion of the CRT which co-acts with the base mold annular cavity 54 to form an annular mold chamber 54, 58 in which the bezel will be formed.

As also shown in FIG. 5, the inner surface of the cover mold 42 may be equipped with an elastic spacer 60 adapted to be interposed between the cover mold and the CRT adjacent to the opening 56 in the cover mold. The cover mold elastic spacer 60 abuts and forms a non-crushing seal with the frustro-conical portion of the CRT. This serves to center the CRT within the base mold with the display surface 16 in tight abutting relation with the bottom 48 of the rectangular cavity of the base mold.

One or more sprue holes 62, 64 may be provided in the cover mold portion 42 to permit insertion of the molding material which will form the bezel 20 into the annular mold chamber 54, 58, as indicated by the vertical arrows in FIG. 5.

The mold slides 44, 46 may be interposed between the cover mold 42 and the base mold 40. In the preferred embodiment, there are two mold slides which may be generally C-shaped in plan view and bar-shaped in cross-section. The slides are configured to be inserted into the mold with the leading edges 44a, 46a of the slides partially protruding into the annular chamber 54, 58 as shown. Edges 44a, 46a form the circumferential channel 28 in the molded bezel.

The bezel 20, is preferably formed using a low pressure molding process, such as reaction injection molding, in which molding material in a plastic state is typically injected into the mold at a pressure of one hundred pounds per square inch (psi). In contrast common injection molding processes typically inject at a pressure of one thousand psi. Such high pressure could damage the fragile CRT. A polyurethane-type material having utility in a low pressure molding process, such as Mobay's Baydur 726, may be employed for molding the bezel. The molding material preferably has a fast cure time, for example between thirty and sixty seconds. The material may be injected into the annular mold chamber 54, 58 through one or more sprue holes 62, 64, and then permitted to cure before the mold is removed.

Once the molding material has cured, the mold slides can be removed, as indicated by the horizontal arrows in FIG. 5, and the cover mold may be lifted off the base mold. The CRT with molded bezel can then be removed from the base mold.

One form of stress encountered with a molding process is thermally-induced mechanical stress produced by the molding material as it cures. This is referred to as "hoop stress". It is caused by the expansion and contraction of the molding material around the periphery of the display screen 16. This hoop stress is principally a circumferentially directed pressure caused by the shrinkage of the molding material as it cures. This circumferentially directed pressure in turn creates radially inwardly (with respect to the plane of the display screen) directed forces on the CRT. Additionally, similar forces may be applied in somewhat forwardly and rearwardly directions (with respect to the plane of the display screen 16) due to the curvature of the surface of the CRT 12. All components of these forces combine to cause a squeezing effect on the periphery of the display screen and the frustro-conical section 24 of the CRT. This increases the possibility of the CRT cracking or imploding.

Expansion or contraction of the bezel can occur both during the molding process and following molding. If a thermoplastic molding material is used for molding the bezel, during molding the material is liquified by heating it and then it is injected into the annular mold chamber 54, 58. The heated thermoplastic material is thermally expanded at this point and causes the surface of the CRT 12 with which it is contact to thermally expand as well. However, the heated material may typically have a substantially greater thermal expansion coefficient (TEC) than the CRT, e.g., one such material has a TEC which is ten times that of the glass of the CRT. After injection, the thermoplastic molding material and the CRT both begin to cool and contract. However, due to the TEC mismatch between the molding material and the glass, the molding material will contract considerably more than the glass of the CRT, causing pressure to be applied to the CRT. A similar contraction of an air cured elastomeric molding material may also apply stresses to the CRT.

Following molding, the video display unit 10, may be exposed to substantial environmental temperature variations, such as when the video display unit is operated in an uncooled environment or when the video display unit is shipped or stored in an unheated one. These environmental temperature variations cause the molding material of the bezel 20 to expand and contract producing varying degrees of hoop stress.

To illustrate the foregoing, consider a CRT 12 with a display screen 16 having a width of fifteen inches and a height of twelve inches. The center of the top edge 16b, as shown in FIGS. 1 and 2, of the display screen can be taken as an arbitrary point from which to measure dimensional changes caused by thermal variations. The expansion or contraction of the molding material on either side of this point 16b will be substantially equal, and therefore, this point can be used as a reference point from which to measure these dimensional changes. The change in the length ($\delta L$) that the molding material will attempt to make along the top half of the display screen, over a temperature variation of thirty degrees Celsius (30° C.), will cause an approximate pressure of 528 psi to be exerted on the CRT by the bezel. This can be demonstrated in the following manner.

The TEC of glass is approximately $9 \times 10^{-6}/°C$., and the TEC of

Mobay's Baydur 726 is $91 \times 10^{-6}/°C$. The resulting difference in length, δL, equals:

$$\delta L = [(91-9) \times 10^{-6}]/°C \times 7.5" = 0.018"$$

Strain=0.018"/7.5"=0.0024 Young's modulus (also known as the elastic or flexural modulus) for Mobay's Baydur 726, a preferred low pressure molding material as previously stated, is 220,000 psi. So that by Hook's Law, this stress (in this case hoop stress) equals Strain×Young's modulus:

$$0.0024 \times 220,000 \; psi = 528 \; psi$$

This is a cyclical stress since it will change with temperature and possibly other environmental variables both during molding and following molding.

Figure 6:
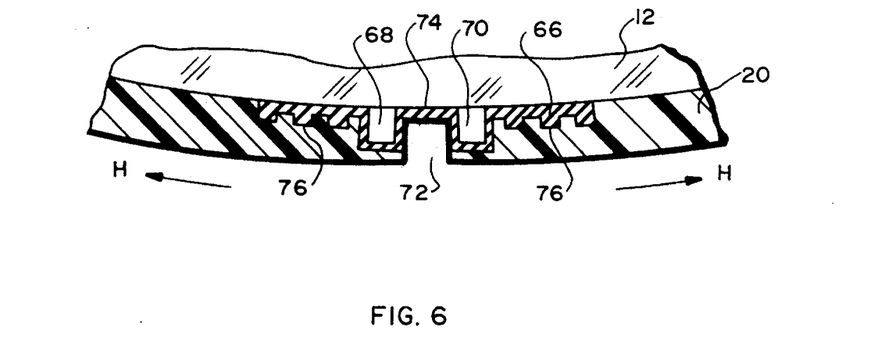
FIG. 6 is cross-sectional view of a resilient member, within the bezel as viewed generally along line 6—6 of FIG. 3.

In accordance with the preferred embodiment of the invention, compensation means are included in the bezel to compensate for hoop stress due to dimensional changes in the bezel as it expands and contracts with temperature changes. As shown in FIG. 6, the compensation means may comprise a resilient member 66 having a combination of one or more corrugations 68, 70 and/or one or more channels 72 formed in the bezel. The resilient member is molded within the bezel 20 and defines the corrugations 68, 70 of the compensating means. The channel 72 is defined by the resilient member and may be formed using a bar portion within the mold 38 (not shown) which extends into the annular mold chamber 54, 58 and into channel 72. The channel 72 is preferably void of any molding material thus forming a structural break in the molding material.

Figure 7:
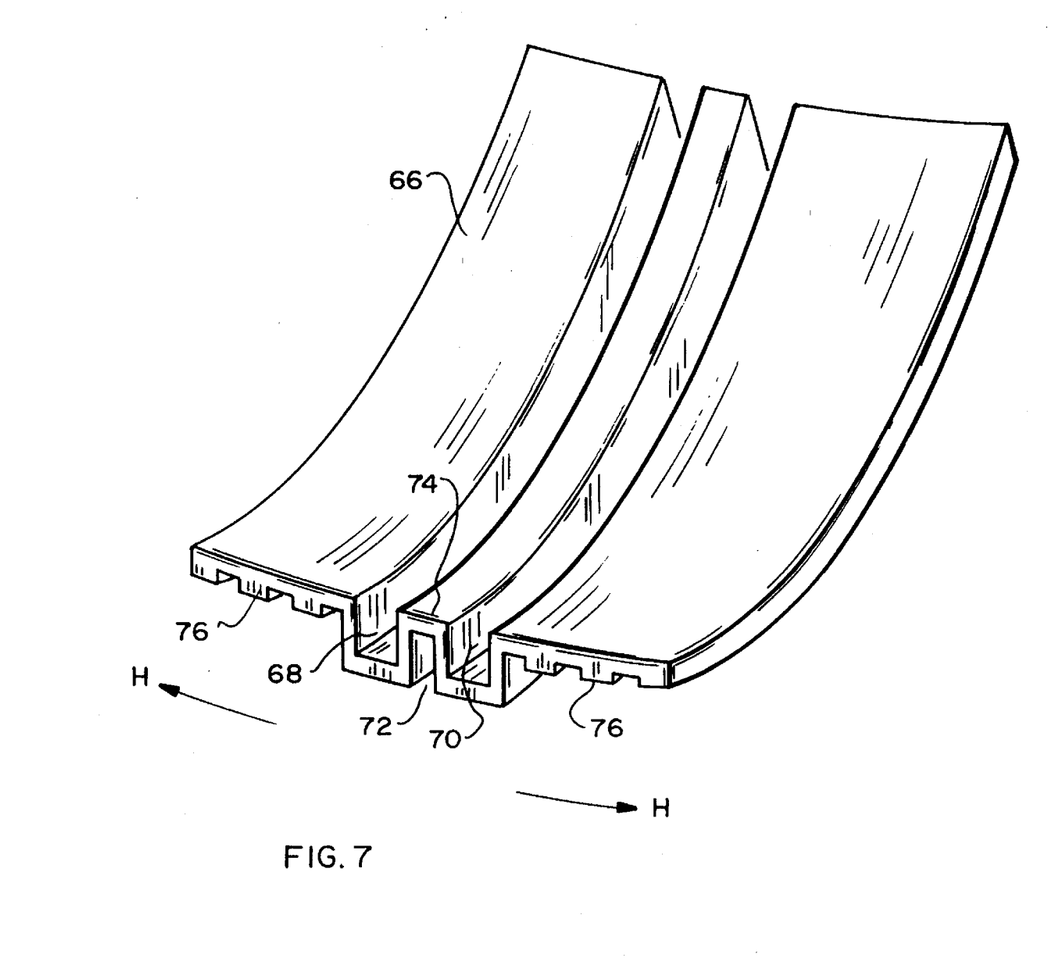
FIG. 7 is a perspective view of the resilient member of FIG. 6.

The corrugations of the resilient member as well as the bezel channel extend transversely with respect to the plane of the display screen and, hence, transversely with respect to the direction of dimensional changes in the bezel (the direction of the arrows H in FIGS. 6 and 7). This orientation serves to minimize the hoop stress exerted on the CRT by allowing the resilient member to absorb the squeezing effect and provides flexibility to compensate for the pulling effect of the molding material as it expands or contracts.

FIG. 7 is a perspective view showing in more detail a preferred form of the resilient member 66. As shown, the resilient member may be configured to be arcuately shaped to conform to the contour of the intermediate surface 22 and adjacent frustro-conical portion 24 of the envelope of the CRT 12. The center 74 of the resilient member may be adhered as with adhesive, to the CRT prior to the molding process in such a way as to position the corrugations 68, 70 about the location where the exposed channel 72 will be molded.

In the preferred embodiment just described, the resilient member 66, may be a corrugated, flexible, injection molded plastic piece or possibly metal, such as steel. For added connection strength between the resilient member 66 and the molding material of the bezel 20, the resilient member can be manufactured to have ridged portions on each side of the corrugated center portion as shown at 76 in FIGS. 6 and 7. These ridges 76 prevent slipping between the molding material and the resilient member.

As can be appreciated by those skilled in the art, the resilient member can be formed in other shapes and from other materials that can be stretched or compressed without damage both during molding and following molding. The exact shape of the corrugation is not important provided that the resilient member is strong enough to maintain the bezel 20 structure and flexible enough to absorb the thermally-induced expansion and contraction of the molding material and thereby prevent pressure from being exerted on the CRT.

When designing the resilient member, the characteristics of the molding material, for example, its post-molding shrinkage, resiliency, and elasticity, and injection temperature and pressure, should be taken into consideration, as will be well understood by those skilled in the art from the foregoing description. The size and shape of the CRT must also be taken into account, as well as the expected temperature range to which the video display unit 10 will be subjected.

Preferably, pairs of diametrically opposed compensation means in the form of structural breaks are employed. These diametrically opposed structural breaks serve to section the bezel into equal portions and thus distribute the dimensional changes in the bezel evenly over the periphery of the CRT. The even distribution of the dimensional changes allows for even distribution of pressure-induced stresses on the CRT and prevents a concentration of pressure on small areas of the CRT.

Although video display devices 12, such as cathode ray tubes, may have their display screens 16 brought within strict tolerances, other elements of the CRT, such as the intermediate surface 22 of the display screen, the frustro-conical portion 24, and the neck 26, may have somewhat more relaxed tolerances. By molding a bezel directly onto the CRT, the exact shape and dimension of the CRT need not be held to strict tolerances. Substantial dimensional and shape variations of the CRT can be compensated for by the size of the annular mold chamber 54, 58. A material such as Mobay's Baydur 726, which is useful in low pressure molding, is sufficiently strong to allow for a very thin bezel around the display screen. The bezel thickness could be created slightly larger, for example, one-eighth of an inch larger, than the maximum expected dimensional variation of the CRT. This would produce a bezel considerably smaller than that produced by conventional methods.

The currently available molding materials, such as Mobay's Baydur 726, that are suitable for a low pressure molding process, such as reaction injection molding, form rigid, aesthetically pleasing surfaces when cured. When using these materials, the curing time can be advantageously as little as thirty to sixty seconds. Thus, the molding process of the invention affords a video display unit 10 comprising a CRT and an integral bezel which is ready to receive a housing 14 notably faster than is possible with conventional methods. Also, the quick curing time of such materials allows one mold to produce many of these units in a day, thereby reducing the production costs. Thus, overall manufacturing cost are further reduced due to a decrease in both assembly time and component costs.

Although the forgoing description has been with reference to a preferred embodiment of the invention, it is to be understood that variations in this preferred embodiment may be made without departing from the spirit of the invention, the scope of which is defined by the appended claims. For example, a bezel can be provided for a video display device having a display screen. The bezel could include a frame for encompassing a periphery of said video display device in a region about said display screen. The bezel could additionally include means disposed within said frame for compensating for dimensional changes in said frame to reduce stress on said video display device.

What is claimed is:

1. A video display unit, comprising:
a video display device having a display screen; and
a bezel directly on said video display device adjacent said display screen for supporting said video display device;
wherein said bezel is molded directly onto said video display device and wherein said bezel further includes: means for compensating for dimensional changes in said bezel to reduce stress exerted on said video display device.

2. A video display unit according to claim 1, wherein said compensating means comprises a resilient member having an arcuate shape and configured to conform to a contoured surface of said video display device.

3. A video display unit according to claim 2, wherein said resilient member has a corrugated portion formed to permit dimensional changes in said resilient member to provide compensation for said dimensional changes in said bezel.

4. A video display unit according to claim 3, wherein said corrugated portion is disposed between first and second side portions of the resilient member which are formed to provide attachment of said resilient member to said bezel.

5. A video display unit according to claim 4, wherein said first and second side portions comprise ridges extending transversely with respect to a direction of said dimensional changes to provide attachment between said bezel and said resilient member.

6. A video display unit according to claim 3, wherein said corrugated portion comprises surfaces shaped to provide a plurality of channels extending transversely with respect to the plane of an opening of said bezel for said display screen.

7. A video display unit according to claim 1, wherein said compensating means comprises a channel in the bezel extending transversely with respect to the plane of an opening of said bezel for said display screen to minimize stress exerted on said video display device by said bezel during said dimensional changes in said bezel.

8. A video display unit according to claim 7 further comprising another channel positioned within said bezel in opposing relationship to said first-mentioned channel, the channels cooperating to define first and second portions of said bezel which allow for even distribution of pressure around the periphery of said display screen due to dimensional changes of said bezel.

9. A video display unit according to claim 2, wherein said bezel is molded directly onto said video display device and has a channel extending circumferentially about the display screen, the channel being formed to provide a snap-fit engagement with a peripheral lip of a supporting structure.

10. A video display unit according to claim 2 further comprising a housing, and wherein said bezel is molded directly onto said video display device and includes means for attachment of said bezel to said housing.

11. A video display unit according to claim 2, wherein said video display device further comprises a body connected to said display screen by an intermediate peripheral surface, and wherein said bezel is molded directly onto said video display device and is configured to extend about said video display device at said intermediate peripheral surface.

12. A video display unit according to claim 11, wherein said bezel has a front lip which overlaps a peripheral portion of said display screen and a rear part which is shaped to conform to said intermediate peripheral surface and said body.

13. A video display unit according to claim 12, wherein said bezel is generally cup-shaped to conform to a contoured surface of said video display device, and wherein said lip and said rear part cooperate to confine said video display device to hold said bezel in place.

14. A video display unit according to claim 1 wherein said video display device comprises a cathode ray tube and said bezel is molded directly onto said video display device and is formed of a material that adheres to said cathode ray tube.

15. A bezel for a video display device having a display screen, comprising:
a molded frame for directly encompassing a periphery of said video display device about said display screen wherein said frame supports said video display device; and
means disposed within said frame for compensating for dimensional changes in said frame to reduce stress on said video display device.

16. A bezel according to claim 15, wherein said compensating means comprises a resilient member having an arcuate shape and configured to conform to a contoured surface of said video display device.

17. A bezel according to claim 16, wherein said resilient member has a corrugated portion to permit dimensional changes in said resilient member to provide compensation for said dimensional changes in said frame.

18. A bezel according to claim 17, wherein said corrugated portion is disposed between first and second side portions of said resilient member which are formed to provide attachment of said resilient member to said frame.

19. A bezel according to claim 18, wherein said first and second side portions comprise ridges extending transversely with respect to a direction of said dimensional changes to provide attachment between said frame and said resilient member.

20. A bezel according to claim 17, wherein said corrugated portion comprises surfaces shaped to provide a plurality of channels extending transversely with respect to the plane of an opening of said frame for said display screen.

21. A bezel according to claim 15, wherein said frame has formed therein a channel extending transversely with respect to the plane of an opening of said frame for said display screen to minimize stress exerted on said video display device by said frame during said dimensional changes in said frame.

22. A bezel according to claim 21 further comprising another channel positioned within said frame in opposing relationship to said first-mentioned channel, the channels cooperating to define first and second portions of said frame which allow for even distribution of pressure around periphery of said display screen due to dimensional changes of said frame.

23. A bezel according to claim 15, wherein said frame has formed therein a channel extending circumferentially about the display screen, the channel being formed to provide a snap-fit engagement with a peripheral lip of a supporting structure.

24. A bezel according to claim 15, wherein said video display device further comprises a body connected to said display screen by an intermediate peripheral surface, and wherein said frame is configured to extend about said video display device at said intermediate peripheral surface.

25. A bezel according to claim 24, wherein said frame has a front lip which overlaps a peripheral portion of said display screen and a rear part which is shaped to conform to said intermediate peripheral surface and said body.

26. A bezel according to claim 25, wherein said frame is generally cup-shaped to conform to a contoured surface of said video display device, and wherein said lip and said rear part cooperate to confine said video display device to hold said bezel in place.

27. A bezel according to claim 15 further comprising an adhesive for adhering said frame to said video display device.

28. A video display unit, comprising:
   a video display device having a display screen; and
   a bezel formed directly onto said video display device by molding said bezel about said video display device in a portion thereof adjacent said display screen; wherein said bezel is further molded about means for compensating for dimensional changes in said bezel to reduce stress exerted on said video display device.

29. A video display unit according to claim 28, wherein said bezel is further molded about a resilient member having an arcuate shape conforming to a contoured surface of said video display device.

* * * * *